(12) United States Patent
Yildiz et al.

(10) Patent No.: US 11,297,380 B2
(45) Date of Patent: Apr. 5, 2022

(54) AUDIO ONLY CONTENT

(71) Applicant: Twitter, Inc., San Francisco, CA (US)

(72) Inventors: Fatih Yildiz, San Francisco, CA (US); Can Envarli, San Francisco, CA (US)

(*) Notice: Subject to any disclaimer, the term of this patent is extended or adjusted under 35 U.S.C. 154(b) by 0 days.

(21) Appl. No.: 16/235,794

(22) Filed: Dec. 28, 2018

(65) Prior Publication Data

US 2020/0213661 A1    Jul. 2, 2020

(51) Int. Cl.
*G06F 17/00* (2019.01)
*H04N 21/439* (2011.01)
*H04N 21/24* (2011.01)
*G06F 16/783* (2019.01)
*H04N 21/218* (2011.01)

(52) U.S. Cl.
CPC ..... *H04N 21/4394* (2013.01); *G06F 16/7834* (2019.01); *H04N 21/218* (2013.01); *H04N 21/24* (2013.01)

(58) Field of Classification Search
CPC .. H04N 21/4394; H04N 21/218; H04N 21/24; H04N 21/2743; H04N 21/44209; H04N 21/4424; H04N 21/454; H04N 21/4788; H04N 21/8106; G06F 16/7834
USPC ......................................................... 700/94
See application file for complete search history.

(56) References Cited

U.S. PATENT DOCUMENTS

| 5,832,119 | A | * | 11/1998 | Rhoads | G07D 7/0034 |
| | | | | | 382/232 |
| 9,590,837 | B2 | | 3/2017 | Glasser | |
| 2002/0144276 | A1 | * | 10/2002 | Radford | H04N 21/2402 |
| | | | | | 725/87 |
| 2006/0182016 | A1 | * | 8/2006 | Walker | H04L 29/06 |
| | | | | | 370/208 |
| 2006/0293073 | A1 | * | 12/2006 | Rengaraju | H04L 29/06027 |
| | | | | | 455/518 |
| 2007/0217436 | A1 | * | 9/2007 | Markley | H04L 12/2803 |
| | | | | | 370/401 |
| 2010/0042826 | A1 | | 2/2010 | Bull et al. | |
| 2011/0289144 | A1 | * | 11/2011 | Underwood | H04L 12/1895 |
| | | | | | 709/204 |
| 2012/0101605 | A1 | * | 4/2012 | Gaalaas | H04S 7/30 |
| | | | | | 700/94 |

(Continued)

FOREIGN PATENT DOCUMENTS

WO    WO 2015-054142    4/2015

OTHER PUBLICATIONS

Adobe audition audio only streams (Year: 2012).*

(Continued)

*Primary Examiner* — Paul C McCord
(74) *Attorney, Agent, or Firm* — Fish & Richardson P.C.

(57) ABSTRACT

Methods, systems, and apparatus, including computer programs encoded on computer storage media, for requesting audio only data for video content. One of the methods includes receiving, from a host server on a network, a plurality of content items, wherein a content item of the plurality of content items references video content. If device conditions, network conditions, or both, indicate that video data of the video content referenced by the content item should not be played on the user device, the user device requests only the audio data of the video content referenced by the content item and plays only the audio data on the user device.

21 Claims, 4 Drawing Sheets

(56) References Cited

U.S. PATENT DOCUMENTS

| | | | |
|---|---|---|---|
| 2013/0064251 A1 | 3/2013 | Jeong et al. | |
| 2014/0006951 A1* | 1/2014 | Hunter | H04H 60/31 |
| | | | 715/719 |
| 2014/0173051 A1* | 6/2014 | Sagayaraj | H04W 4/18 |
| | | | 709/219 |
| 2014/0337473 A1* | 11/2014 | Frusina | H04L 5/003 |
| | | | 709/217 |
| 2015/0269658 A1* | 9/2015 | DeFeudis | G06Q 30/0641 |
| | | | 705/26.5 |
| 2016/0105388 A1* | 4/2016 | Bin Mahfooz | H04L 51/10 |
| | | | 709/206 |
| 2016/0381399 A1* | 12/2016 | Brondijk | H04N 21/234 |
| | | | 725/116 |
| 2016/0381414 A1 | 12/2016 | Legair-Bradley et al. | |
| 2017/0032402 A1* | 2/2017 | Patsiokas | G06Q 30/0207 |
| 2017/0041355 A1* | 2/2017 | Ramamurthy | H04L 65/1089 |
| 2017/0097741 A1* | 4/2017 | Liang | G06F 16/9574 |
| 2017/0177296 A1* | 6/2017 | Quirino | G06F 3/0482 |
| 2018/0192142 A1* | 7/2018 | Paul | H04N 21/64738 |
| 2019/0208270 A1* | 7/2019 | Bates | H04N 21/41407 |
| 2019/0280793 A1* | 9/2019 | Yamagishi | H04N 21/4755 |

OTHER PUBLICATIONS

PCT Written Opinion of the International Searching Authority in International Appln. No. PCT/US2019/068987, dated Apr. 22, 2020, 10 pages.

* cited by examiner

AUDIO ONLY CONTENT

BACKGROUND

This specification relates to a social messaging platform, and in particular, to a system that requests audio streams from the social messaging platform when the system determines that video streams should not be played on a user device.

Social messaging platforms and network-connected personal computing devices allow users to create and share content across multiple devices in real-time.

Sophisticated mobile computing devices such as smartphones and tablets make it easy and convenient for people, companies, and other entities to use social networking messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform without specific designation by the authoring user. Examples of popular social messaging platforms include Facebook, Pinterest, and Twitter. ("Facebook" is a trademark of Facebook, Inc. "Pinterest" is a trademark of Pinterest, Inc. "Twitter" is a trademark of Twitter, Inc.)

SUMMARY

This specification relates to social messaging platforms, and in particular, to a system that requests and presents only audio data from a social messaging platform when the system determines that video data of video content should not be played on the user device.

In this specification, video content refers broadly to a collection of one or more resources that allows a video having still or moving imagery and audio to be presented on a user device. Video content thus has both video data representing the still or moving imagery, as well as audio data representing the audio.

In this specification, a content item refers to data received from a social messaging platform that a user device can display as a distinct user interface element of a user application. A content item can therefore be a user authored message, an announcement, or an advertisement, to name just a few examples. The content items described in this specification specifically have the ability to reference video content—meaning that in some circumstances, video data can be displayed on the user device in the user interface within the boundaries of the content item presentation. As will be described in more detail below, in some situations, displaying the video data within the content item may be undesirable. Instead, the user device can present only the audio data of the video content referenced by a content item. The user device may or may not display any image data within the content item while the audio data is being presented. For example, the user device can display an audio presentation user interface, a blank content item, or a still image.

The subject matter described in this specification can be implemented in particular embodiments so as to realize one or more of the following advantages. When device conditions, network conditions, or both are such that playing video data on a user device is impossible or impractical, the system described herein can request corresponding audio data so that the user can still partially experience the video content. By automatically and dynamically determining when device and network conditions are suitable for playing video data, the system can ensure that the user receives an optimal format, i.e., audio data or video data, of the video content under different network conditions. This can increase user satisfaction and user engagement with both the content items and the platform itself.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
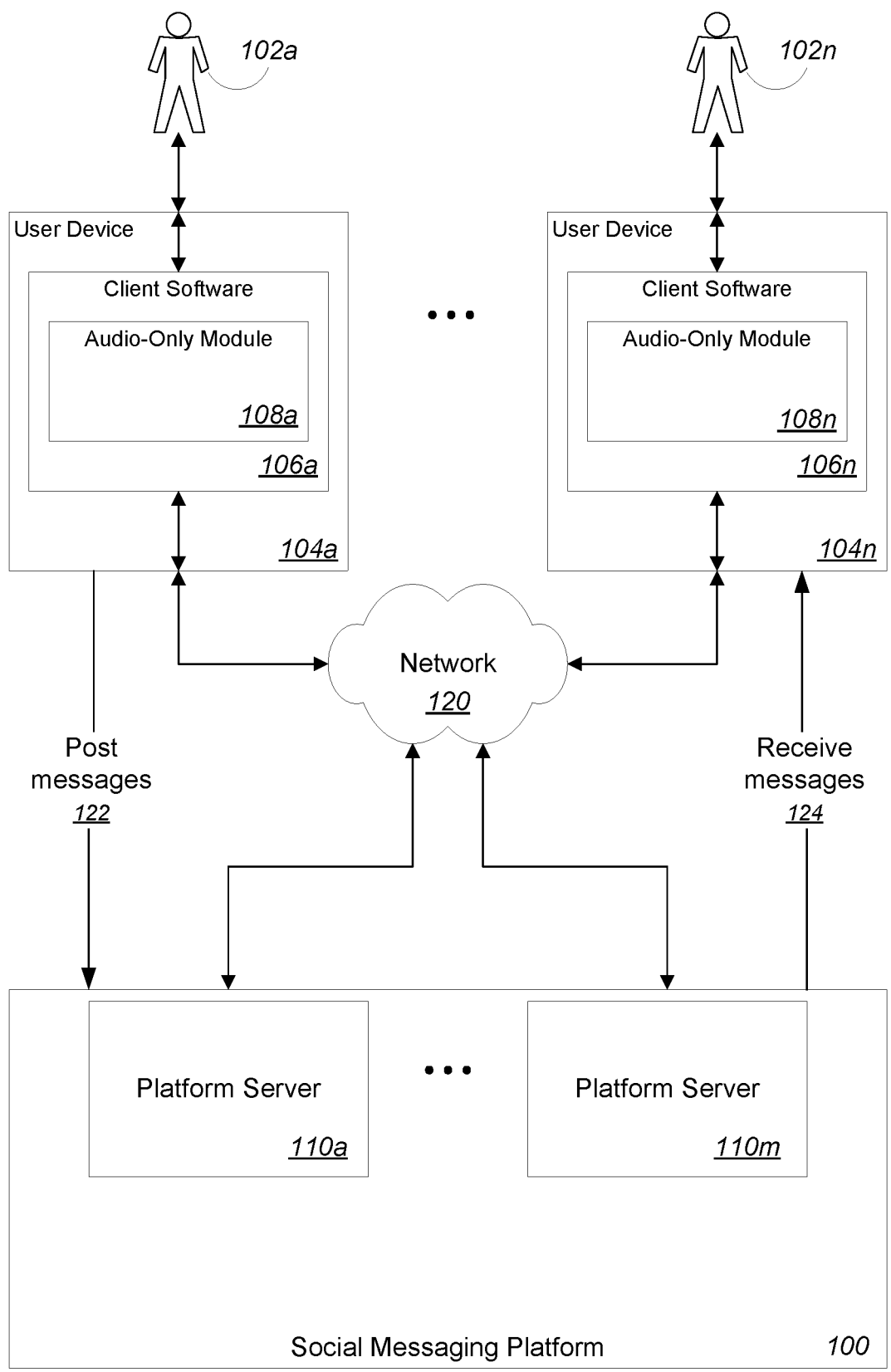
FIG. 1 depicts an example system having user devices in communication with a social messaging platform.

FIG. 1 illustrates an example online social messaging platform 100 and example user devices 104*a*-104*n* configured to interact with the platform 100 over one or more data communication networks 120. The platform, the user devices, or both are configured, as will be described, to implement or perform one or more of the innovative technologies described in this specification.

The platform 100 is implemented on one or more platform servers 110*a*-110*m*, which can, for example, be part of a cluster of computers. Each platform server 110*a*-*m* is implemented on one or more computers, e.g., which can be virtual or physical machines hosted in a datacenter.

Users 102*a*-102*n* of the platform can use user devices 104*a*-104*n*, on which client software 106*a*-106*n* is installed, to use the platform 100. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

In some implementations, the platform allows use of the platform by users who are not account holders or who are not logged in to an account of the platform. If the platform allows use by such users, the platform may allow such a user to post messages or to use other functionality of the platform by associating the user with a temporary account or identifier.

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 106*a*-106*n*, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform. Or the client may be or include a Short Messaging Service (SMS) interface, an instant messaging interface, an e-mail-based interface, or an API function-based interface, for example.

The client software 106a includes a module, e.g., an audio-only module 108a, that is configured to determine, based on device conditions, network conditions, or both, whether the user device should play video data that is referenced by a respective message, stream, or content item. The audio-only module 108a can be a function within the client software 106a. The audio-only module 108a can also be a separate application that is configured to interact with the client software 106a and the platform 100. In some cases, the platform 100 can provide the audio-only module 108a to the user device 104a in response to a request initiated by a user in the client software 106a.

In response to determining that the user device 104a should not play video data, the audio-only module 108a can request from the social messaging platform 100 only the audio data of the referenced video content. That is, the module 108a requests that the platform provide the audio data of the video content, but not the corresponding frames of video data of the video content.

The social messaging platform 100 is implemented on one or more computers in one or more locations that operate as one or more servers that support connections over wired or wireless networks 120 to many different kinds of user devices. The platform may have many millions of accounts, and anywhere from hundreds of thousands to millions of connections may be established or in use between clients and the platform at any given moment.

The network 120 can include any appropriate combination of wired or wireless networks. The wireless networks can include Wi-Fi networks, which is shorthand for wireless networks that conform to the IEEE 802.11 wireless standard. Wi-Fi networks generally support short-range communications that have a usable range of 100 meters or less between a user device and an access point. The network 120 can also include non-Wi-Fi cellular networks, which includes wireless networks that support longer ranges than Wi-Fi, e.g., more than 100 meters. Examples of non-Wi-Fi cellular networks include code-division multiple access (CDMA) networks, Global System for Mobile communications (GSM) networks, and Long-term evolution (LTE) networks, to name just a few examples. Generally, Wi-Fi networks provide higher bandwidth and shorter ranges than non-Wi-Fi networks, although these relative characteristics can overlap and be reversed in some circumstances. Another difference is that typically providers of non-Wi-Fi cellular networks meter data consumption and impose data quotas, while data consumption on Wi-Fi networks is unmetered. Therefore, in the context of audio-only content, a user device 104a-n may be configured to only request only audio data when communicating with the platform 100 on a non-Wi-Fi cellular network due to the corresponding data quotas.

The platform facilitates real-time communication. The platform and client software are configured to enable users to use the platform to post messages 122 to the platform and to use the platform to receive messages 124 posted by other users.

In some implementations, the platform provides facilities for users to send messages directly to one or more other users of the platform, allowing the sender and recipients to maintain a private exchange of messages.

The platform is configured to provide content, generally messages, to a user in a home feed message stream. The messages will generally be messages from accounts the user is following, meaning that the recipient has registered to receive messages posted by the followed account, and optionally content that such accounts have engaged with, e.g., endorsed. Optionally, the platform is configured to include in a recipient user's home feed messages that the platform determines are likely to be of interest to the recipient, e.g., messages on topics of particular current interest, as represented by the number of messages posted on the topics by platform users, or messages posted on the topics of apparent interest to the recipient, as represented by messages the recipient has posted or engaged with, as well as selected advertisements, public service announcements, promoted content, or the like.

The platform is configured to enable users to exchange messages in real-time, i.e., with a minimal delay. The platform is also configured to enable users to respond to messages posted earlier, on the order of hours or days or even longer. The platform is configured to display posted messages to one or more other users within a short time frame so as to facilitate what can essentially be a live conversation between the users.

Thus, the basic messaging functionality of the platform includes at least posting new messages; providing message streams on client request; managing accounts; managing connections between accounts, messages, and streams; and receiving engagement data from clients engaging with messages. The platform also indexes content items and access data and can provide the indexed data to account holders.

In some implementations of the platform, a message contains data representing content provided by the author of the message. The message may be a container data type storing the content data. The types of data that may be stored in a message include text, graphics, images, audio, video, and computer code, e.g., uniform resource locators (URLs), for example. In some cases, videos in messages play automatically when a user views those messages in the client software. However, some users may be constrained by data limits or network bandwidth and may prefer that videos not play automatically. Other users may prefer that the platform deliver video data only under certain circumstances, e.g., when they have not reached their data limit and when network bandwidth is sufficient to stream high-video. The audio-only module 108a can process these and other factors and request that the platform provide corresponding audio data instead of the video data.

Messages can also include key phrases, e.g., hashtags, that can aid in categorizing or relating messages to topics. Messages can also include metadata that may or may not be editable by the composing account holder, depending on the implementation. Examples of message metadata include a time and date of authorship and a geographical location of the user device when it submitted the message. In some implementations, what metadata is provided to the platform by a client is determined by privacy settings controlled by the user or the account holder.

Messages composed by one account holder may reference other accounts, other messages, or both. For example, a message may be composed in reply to another message composed by another account. A message may also be composed by a user in reply to a message originally posted by the user. Messages may also be republications of a message composed by and received from another account. Generally, an account referenced in a message may appear as visible content in the message, e.g., the name of the account, and may also appear as metadata in the message. As a result, the referenced accounts can be interactive in the platform. For example, users may interact with account names that appear in their message stream to navigate to the message streams of those accounts. The platform also allows messages to be private; a private message will only appear in the message streams of the composing and recipient accounts.

In some implementations, messages are microblog posts, which differ from e-mail messages, for example, in that an author of a microblog post does not necessarily need to specify, or even know, who the recipients of the message will be.

A stream is a stream of messages on the platform that meet one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

In some implementations, the platform tracks engagement with messages. In some implementations, the platform maintains, in a message repository, data that describes each message as well as the engagement with each message.

Engagement data can include any type of information describing user activity related to a message by an engaging account of the platform. Examples of engagement by a user include, for example, reposting the message, marking the message to indicate it is a favorite of, liked by, or endorsed by the user, responding to the message, and mentioning or referencing the message.

The servers of the platform perform a number of different services that are implemented by software installed and running on the servers. The services will be described as being performed by software modules. In some cases, particular servers may be dedicated to performing one or a few particular services and only have installed those components of the software modules needed for the particular services. Some, modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

Client software allows account holders receiving a stream to engage, e.g., interact with, comment on, or repost, the messages in the stream. An engagement module receives these engagements and stores them in an engagement repository. Types of engagement include selecting a message for more information regarding the message, selecting a URI (universal resource identifier) or hashtag in a message, reposting the message, or making a message a favorite. Other example engagements types include opening a "card" attached to message, which presents additional content that is a target of a link in the message, or links to an application installed on the user device. Account holders may engage further with the additional content, e.g., by playing video data or audio data or by voting in a poll.

In addition to recording active interactions with messages through explicitly received user device input, the engagement module may also record passive interactions with messages. An impression occurs when a client presents the content of a message on a user device. Impression engagements include the mere fact that an impression occurred, as well as other information, e.g., whether a message in a stream appeared on a display of the user device, and how long the message appeared on the display.

Any engagement stored in the engagement repository may reference the messages, accounts, and/or stream involved in the engagement.

Engagements may also be categorized beyond their type. Example categories include engagements expressing a positive sentiment about a message ("positive engagements"), engagements expressing a negative sentiment about a message ("negative engagements"), engagements that allow an advertiser account to receive monetary compensation ("monetizable engagements"), engagements that are expected to result in additional future engagements ("performance engagements"), or connection engagements that are likely to result in one account holder following another account ("connection engagements"). The negative engagements category includes, for example, engagements dismissing a message or reporting a message as offensive while the positive engagements category typically includes engagements not in the negative engagements category. Example performance engagements include selecting a URL (uniform resource locator) in a message or expanding a card. Example monetizable engagements include, for example, engagements that result in an eventual purchase or a software application install on a user device. Generally, categories and types are not coextensive; a given type of engagement may fall into more than one category and vice versa.

Figure 2:
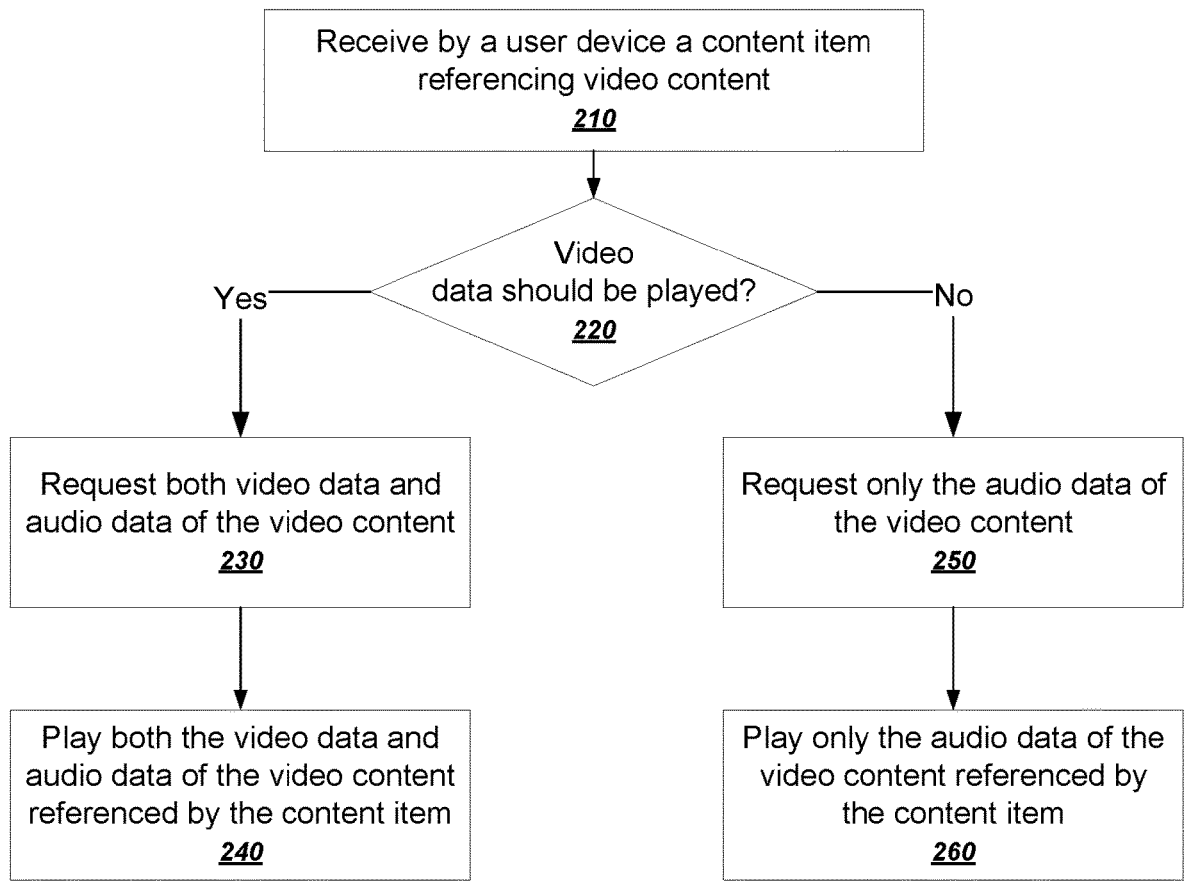
FIG. 2 is a flowchart of an example process for requesting from a social messaging platform only audio data for video content that is referenced by a content item.

FIG. 2 is a flowchart of an example process for requesting from a social messaging platform only audio data for video content that is referenced by a content item. For convenience, the process will be described as being performed by a user device having one or more computers. For example, the user device 104*a* of FIG. 1 can perform the process.

The device receives from a host server of the social messaging platform a content item that references video content (210). The video content can include streamed video, e.g., live video or on-demand video, or previously recorded video content.

The system determines whether video data of the video content should be played on the user device (220). Most video streams require a network bandwidth of nearly 400 Kbps. However, more than 50% of the world, and more than 80% of India, has only 128 Kbps of bandwidth on cellular devices. But an audio only stream can be delivered with as little as 64 Kbps, 48 Kpbs, or 36 Kbps depending on the audio quality. Therefore, even when the conditions do not warrant playing video data, playing audio data can still be advantageous.

The system can use device conditions, network conditions, or both, to determine whether the user device should play the video data of the video content referenced by the content item.

Device conditions are conditions specific to the user device on which the system runs. One device condition is a state of a display screen of the user device, e.g., on, off, asleep, or locked. A second device condition is a state of the client software, e.g., running in the foreground, running in the background, or not running. A third device condition is an amount of data remaining in a data plan of the user device. A fourth device condition is whether the user device is connected to a Wi-Fi network. The device conditions described above are merely examples, and the system may use other device conditions to determine whether the user device should not play video.

Network conditions are conditions that relate to a speed or a strength of a network connection between the user device and the host server. One network condition is an average rate of successful data transfer from the host server to the user device, i.e., the network bandwidth. The system can measure network bandwidth by measuring a difference between a time a first portion of a respective video file is received and a time a last portion of the video file is received. The system can then divide the size of the video, if known, by the measured time difference to calculate the network bandwidth in bits per second.

The device can use any appropriate device or network condition, alone or in combination, to determine that video should not be played on the user device.

For example, the device can determine that video data should not be played on the user device by determining that the network bandwidth is insufficient to stream the video data at a particular quality.

As another example, the device can determine that video data should not be played on the user device by determining that the client software is running in the background of the user device. In other words, the device can determine that the client software is running, but that the user interface of the client software is not displayed on the display screen of the user device. In such a circumstance, requesting and playing video data may unnecessarily waste data and network bandwidth when the user could not watch the video.

As another example, the device can determine that video data should not be played on the user device by determining that a display screen of the user device is asleep or locked. When the screen is locked, for example, requesting and playing video data would unnecessarily waste data and network bandwidth.

As another example, the device can determine that video data should be requested due to the video content being tagged by the social messaging platform as inappropriate for audio only content. For example, the creator of the video content can interact with the social messaging platform to set a flag specifying that the social messaging platform should not provide separate audio data for the video content. For example, the creator of the video content may set the flag after determining that the video content cannot be effectively communicated as only audio data. For example, a creator of video content might determine that a tennis match cannot be conveyed effectively as only audio data. Therefore, the social messaging platform can decline to split the video data and audio data for such video content.

In some implementations, the social messaging platform can automatically set a no-audio-only flag based on previous user engagement data. For example, the system can analyze user engagement with the video content when provided with both video data and audio data, and separately when the video content is provided with only audio data. If the user engagement data indicates a severe drop-off in user engagement when only audio data is provided, the system can automatically set the no-audio-only flag. In some implementations, the no-audio-only flag can be included as metadata in the content item itself or the video content itself.

An example process for determining whether video data should be played at a user device is described in detail below with reference to FIG. 3.

If the device determines that video data should be played (220), the device requests both video data and audio data of the video content (branch to 230). For example, the social messaging platform can store the video content in separate files for video data and audio data. The social messaging platform can also reformat the video data and audio data into files having different formats and different levels of quality for distribution over lower-quality networks. The social messaging platform can compress the video data using any appropriate video coding format, e.g., MPEG-4, H.264, or VP9. The social messaging platform can also bundle the encoded video data with audio data in any appropriate multimedia container, e.g., AVI, MP4, or FLV.

The device then plays both the video data and the audio data of the video content referenced by the content item (240). In other words, the device can present the video data on a display device of the user device and can present the audio data using integrated or external speakers connected to the user device.

The device can request entire files of video data, audio data, or both before playing the video content. Alternative or in addition, the device can continually receive and present streamed video content. For example, the user device can display the streamed video data as it is received from the host server. In other words, the user device need not receive all the video data or audio data of the video content before displaying parts of the video content. The server can deliver the multimedia container as a bit stream using a network protocol, e.g., the Real-Time Streaming Protocol (RSTP), Real-Time Transport Protocol (RTP), or the Real-Time Transport Control Protocol (RTCP). These protocols define rules for synchronization of multimedia communication between the host server and the user device, including error recovery methods.

If the device determines that video data should not be played on the user device, the device requests only audio data from the host server (branch to 250). In other words, even though the content item referenced video content specifically, the user device can request only the audio data of the video content.

The social messaging platform can deliver pre-prepared audio files extracted from the video content. Alternatively or in addition, the social messaging platform can separate the audio data from the video content after receiving the request for only audio data.

The device plays only the audio data of the video content referenced by the content item (260). In other words, the user device can play audio data at the user device without receiving and without displaying video data of the video content. In some implementations, the user device receives some image data, e.g., an image file that the user device can display place of the video data. In some implementations, the user device can present an audio interface that provides some audio controls, e.g., play, pause, rewind, and fast forward, to name just a few examples.

In some cases, the user device continues to play the audio data in the background, e.g., after closing or minimizing an application that presents the content item, e.g., a web browser or a dedicated social messaging platform application. In other words, the user device can continue to play the audio data while the user device runs another application in the foreground of the user device operating system.

Figure 3:
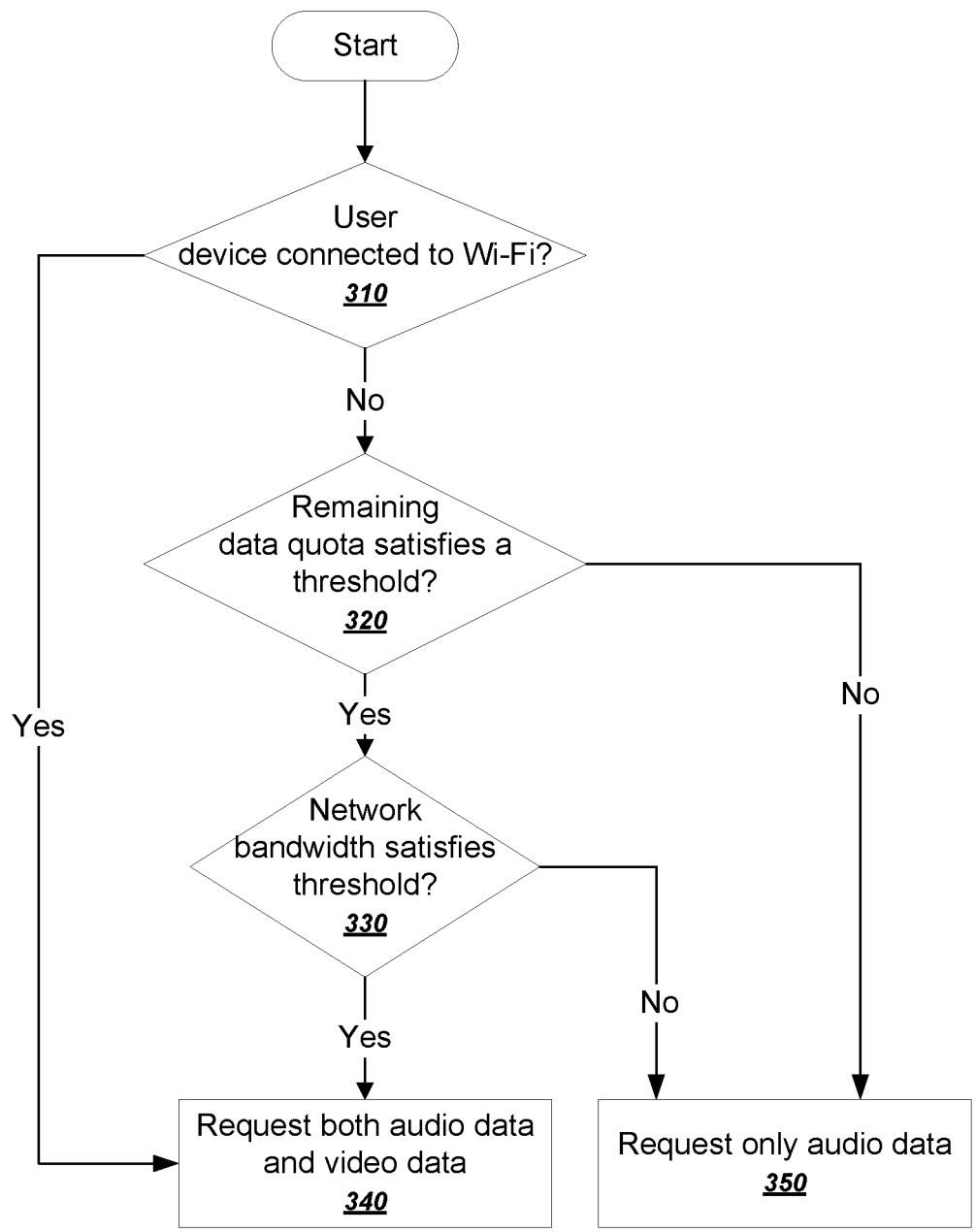
FIG. 3 is a flowchart of an example process for determining, based on device and network conditions, whether video data should not be played on a user device.

FIG. 3 is a flowchart of an example process for determining, based on device and network conditions, whether video data should not be played on a user device. The example process can be performed by any appropriate user device in communication with a social messaging platform. For convenience, the process will be described as being performed by a device having one or more computers.

The device determines whether it is connected to a Wi-Fi network (310). As described above, Wi-Fi networks generally have higher bandwidth than non-Wi-Fi cellular networks and unmetered connections. Therefore, if the user device is connected to a Wi-Fi network, the user device requests both audio data and video data (branch to 340).

If the device is not connected to a Wi-Fi network (310), the device determines whether a remaining data quota satisfies a threshold (320). Some user devices maintain or have access to a data quota, which refers to the total size of non-Wi-Fi data consumed by the device, which means data sent to the device, received at the device, or both, over non-WiFi wireless networks, e.g., cellular communications networks. The data quota can refer to data consumed over a recent time period, e.g., the last day, week, or month, or data consumed within a current time period, e.g., the current day, week, or month. The device can compute such information locally or request such information from a remote server that maintains usage statistics for the cellular service carrier of the user device.

Software installed on the user device can then obtain the data quota information locally from the device itself, e.g., by using an API of the underlying operating system, or by requesting such information directly from the server of the cellular service carrier. In some implementations, the user needs to grant the client software the appropriate permissions before this functionality is enabled.

The threshold can be any appropriate fraction of the data quota, e.g., 50%, 80%, or 100%. For example, if the user device has used over 80% of the data quota, the device can determine that the threshold is satisfied. In that case, the device may determine that video data should not be played in order to conserve the remainder of the data quota.

Thus, if the remaining data quota does not satisfy the threshold, the device requests only audio data (branch to 350). In other words, when presenting a content item that references video content, the device will request only audio data of the video content from the social messaging platform.

If the remaining data quota does satisfy the threshold (320), the device determines whether a network bandwidth satisfies a threshold (branch to 330). If the network bandwidth is too low to reliably support transmitting video data, the device can mitigate such bandwidth constraints by requesting only the audio data of referenced video content. The device can use any appropriate value for the network bandwidth, e.g., 500 kbps, 1 Mbps, or 10 Mbps, to name just a few examples.

Thus, if the network bandwidth does not satisfy a threshold (330), the device requests only audio data (350).

On the other hand, if the network bandwidth does satisfy the threshold (330), the device requests both audio data and video data for the referenced video content (branch to 340).

Figure 4:
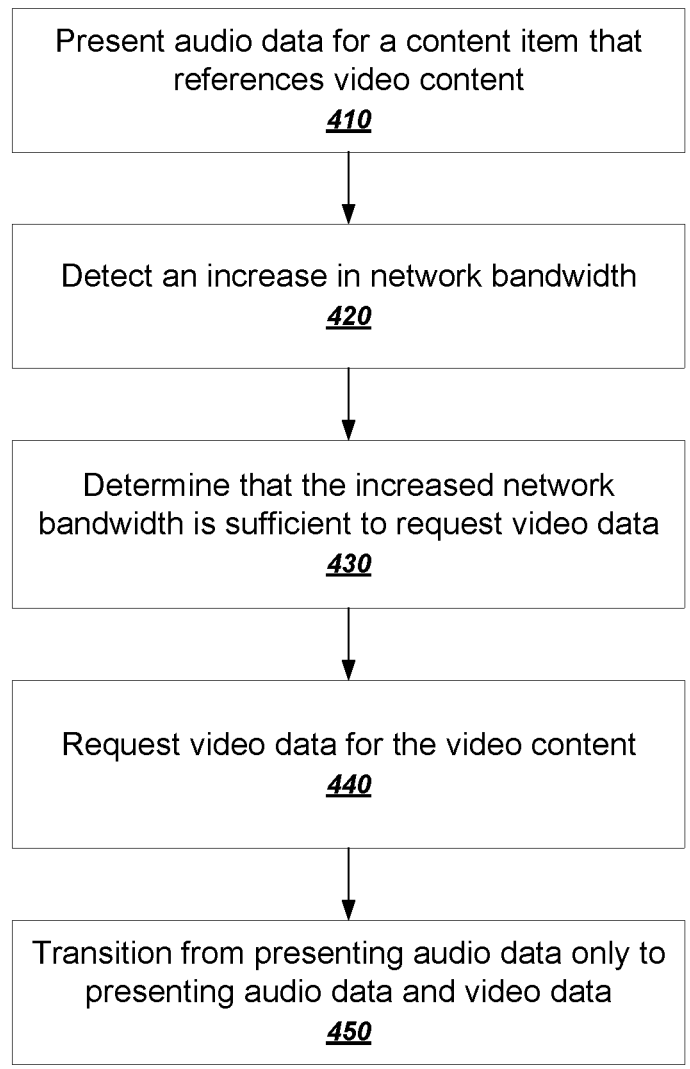
FIG. 4 is a flowchart of an example process for requesting both audio data and video data after initially presenting only audio data.

FIG. 4 is a flowchart of an example process for requesting both audio data and video data after initially presenting only audio data. The example process can be performed by any appropriate user device in communication with a social messaging platform. For convenience, the process will be described as being performed by a device having one or more computers.

The device presents audio data for a content item that references video content (410). In other words, for a content item that references video content having both video data and audio data, the device requests only the audio data and not the video data. As described above, instead of presenting video data, the device can display a blank space within the content item or a still image within the content item.

The device detects an increase in network bandwidth (420). The device periodically measure the download rate of the data received by the device. The device can measure the network bandwidth overall or specifically the network bandwidth from the social messaging platform.

Certain environmental conditions can cause the network bandwidth to increase. For example, the device may move closer to a cellular service tower, thereby increasing the strength of a cellular signal that provides the audio data. Or weather conditions can improve so that atmospheric interference is mitigated, thereby also improving the strength of the cellular signal. Or the device can move to a location serviced by a different cellular service tower or a tower on a different network entirely.

The device determines that the increased network bandwidth is sufficient to request video data (430). The device can compare the increased network bandwidth to an overall bandwidth threshold. If the network bandwidth increases above the threshold, the device can request video data along with audio data for the video content referenced in the content item. The device can also use a time threshold to ensure that that increased network bandwidth is not transient and lasts for a duration that is at least the time threshold.

The client software of the device can also maintain multiple thresholds, one corresponding to each of multiple different levels of video quality. As described above, the server system can regenerate multiple different versions of the video content, each corresponding to a different level of quality and therefore a corresponding level of network bandwidth. The device can then determine that the increased network bandwidth satisfies the threshold if the network bandwidth increases above any of the maintained thresholds for each of the different versions of video.

The device requests video data for the video content (440). The device can modify requests to the social messaging platform to also provide video data for the referenced video content in addition to the audio data that is currently being presented. If the system maintains multiple versions of the video content, the device can highest-quality version the increased network bandwidth can support and can request that highest-quality version.

In some implementations, the request includes a marker that represents a location in the video content corresponding to how much audio data has been presented. The system can then respond with video data that starts at the location represented by the marker. For example, if the device has presented audio data for half he video content, the device can provide a marker to the social messaging platform representing that 50% of the video content has been presented as audio-only data. Then, when the social messaging platform responds with video data, the platform can provide video data starting at or around 50% of the way through the video content.

The device transitions from presenting audio data only to presenting audio data and video data for the referenced video content (450). For example, the device can transition from displaying a blank content item or a still image in the content item to displaying video data corresponding to the location in the presented audio data. Notably, the device does not need to stop and restart playing the video content from the beginning. Rather, the device can seamlessly present the audio data without interruption while also initiating displaying video data at the current position in the video content.

If the network bandwidth again decreases below a threshold, the device can make a similar transition back to presenting audio data only. In other words, the device need not stop the presentation of the audio data, and can instead maintain the presentation of the audio data while stopping the requesting and receiving of video data for the referenced video content.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing devices, cause the devices to perform the operations or actions. For special-purpose logic circuitry to be configured to perform particular operations or actions means that the circuitry has electronic logic that performs the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving, from a host server on a network, a plurality of content items, wherein a content item of the plurality of content items references video content, and wherein the host server stores the video content referenced by the content item as video data and audio data that is separate from the video data;

determining, based on device conditions, network conditions, or both, that video data of the video content referenced by the content item should not be played on the user device;

in response, requesting, by the user device from the host server, only the audio data of the video content referenced by the content item; and receiving the audio data and playing the audio data on the user device.

Embodiment 2 is the method of embodiment 1, wherein playing the audio data on the user device comprises playing the audio data of the video content without presenting video data of the video content referenced by the content item.

Embodiment 3 is the method of any one of embodiments 1-2, wherein determining, based on device conditions, network conditions, or both, that the video content referenced by the content items should not be played on the user device comprises:

determining that a measure of network bandwidth of a non-Wi-Fi network between the host server and the user device does not satisfy a threshold.

Embodiment 4 is the method of any one of embodiments 1-3, wherein the operations further comprise:

presenting, by the user device, audio data of the video content referenced by the content item without presenting video data of the video content referenced by the content item;

detecting, by the user device, an increase in network bandwidth;

determining that the increased network bandwidth is sufficient to stream a version of video data of the video content referenced by the content item;

in response, requesting, by the user device from the host server, video data for the video content referenced by the content item; and transitioning from presenting only audio data of the video content to presenting audio data and video data of the video content referenced by the content item.

Embodiment 5 is the method of embodiment 4, wherein transitioning from presenting only audio data of the video content to presenting audio data and video data of the video content referenced by the content item comprises initiating presentation of the video data without restarting the video content referenced by the content item.

Embodiment 6 is the method of embodiment 5, wherein requesting, by the user device from the host server, video data for the video content referenced by the content item comprises:

computing a location in the video content corresponding to how much audio-only data has been presented on the user device; and providing the computed location as part of the request, wherein initiating presentation of the video data without restarting the video content referenced by the content item comprises initiating presentation of the video data at or after the computed location.

Embodiment 7 is the method of embodiment 4, wherein the host server stores a plurality of versions of the video data, wherein each version has a different respective required bandwidth, and wherein requesting, by the user device from the host server, video data for the video content referenced by the content item comprises requesting a version of the video data corresponding to the increased network bandwidth.

Embodiment 8 is the method of any one of embodiments 1-7, wherein determining, based on device conditions, network conditions, or both, that the video content should not be played on the user device comprises:

determining that a screen of the user device is asleep or locked.

Embodiment 9 is the method of any one of embodiments 1-8, wherein determining, based on device conditions, network conditions, or both, that the video content should not be played on the user device comprises:

determining that a user interface of an application that causes the user device to display the video content is closed.

Embodiment 10 is the method of any one of embodiments 1-9, wherein the operations further comprise receiving, from the host server, a second content item with second video content having a no-audio-only flag that indicates that the second video content should not be presented with only audio data; and determining based on the no-audio-only flag that the second video content should be presented with video data despite device conditions, network conditions, or both; and in response, requesting both video data and audio data of the second video content.

Embodiment 11 is the method of embodiment 10, wherein the no-audio-only flag is set by a creator of the video content.

Embodiment 12 is the method of embodiment 10, wherein the no-audio-only flag is set by the host server based on previous user engagement data with the content item.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that are operable, when executed by the one or more computers, to cause the one or more computers to perform operations comprising:
   receiving, by a user device from a messaging platform, a plurality of content items to be presented in a message stream on the user device, wherein a content item of the plurality of content items references video content having audio data and video data stored by the messaging platform, wherein the user device is configured to request only audio data of content items referencing video content in response to determining that one or more audio-only criteria are satisfied;
   presenting, by the user device, the plurality of content items in a message stream;
   determining, by the user device, that the one or more audio-only criteria are satisfied;
   receiving, by the user device from the messaging platform, a selection within the message stream of a user interface element of a content item referencing video data, wherein the selection represents a user request to present content referenced by the content item;
   determining, by the user device, that the content item is associated with a no-audio-only flag set by the messaging platform;
   in response to determining that the content item is associated with the no-audio-only flag set by the messaging platform, requesting, by the user device, video data of the video content referenced by the content item despite the one or more audio-only criteria being, satisfied; and
   receiving and presenting the video data of the video content referenced by the content item.

2. The system of claim 1, wherein the user device is configured to play the audio data of the video content on the user device when the one or more audio-only criteria are satisfied and the no-audio-only flag has not been set, including playing the audio data of the video content without presenting video data of the video content referenced by the content item.

3. The system of claim 1, wherein determining that the one or more audio-only criteria are satisfied comprises:
   determining that a measure of network bandwidth of a non-Wi-Fi network between the messaging platform and the user device does not satisfy a threshold.

4. The system of claim 1, wherein determining that the one or more audio-only criteria are satisfied comprises determining that a measure of network bandwidth exceeds a threshold for at least a time threshold.

5. The system of claim 1, wherein determining that the one or more audio-only criteria are satisfied comprises:
   determining that a screen of the user device is asleep or locked.

6. The system of claim 1, wherein determining that the one or more audio-only criteria are satisfied comprises:
   determining that a user interface of an application that causes the user device to display the video content is closed.

7. The system of claim 1, wherein the messaging platform is configured to perform operations comprising:
   analyzing, by the messaging platform, previous user engagement data with the content item when presented with both video data and audio data, and separately when only audio data is presented with the video content;
   determining, by the messaging platform, that a first measure of user engagement with the content item when presented with only audio data satisfies a threshold relative to a second measure of user engagement with the content item when presented with both video data and audio data; and
   in response, setting, by the messaging platform, the no-audio-only flag for the content item.

8. A computer-implemented method comprising:
   receiving, by a user device from a messaging platform, a plurality of content items to be presented in a message stream on the user device, wherein a content item of the plurality of content items references video content having audio data and video data stored by the messaging platform, wherein the user device is configured to request only audio data of content items referencing video content in response to determining that one or more audio-only criteria are satisfied;

presenting, by the user device, the plurality of content items in a message stream;

determining, by the user device, that one or more audio-only criteria are satisfied;

receiving, by the user device from the messaging platform, a selection within the message stream of a user interface element of a content item referencing video data, wherein the selection represents a user request to present content referenced by the content item;

determining by the user device, that the content item is associated with a no-audio-only flag set by the messaging platform;

in response to determining that the content item is associated with the no-audio-only flag set by the messaging platform, requesting, by the user device, video data of the video content referenced by the content item despite the one or more audio-only criteria being satisfied; and receiving and presenting the video data of the video content referenced by the content item.

9. The method of claim 8, wherein the user device is configured to play the audio data of the video content on the user device when the one or more audio-only criteria are satisfied and the no-audio-only flag has not been set, including playing the audio data of the video content without presenting video data of the video content referenced by the content item.

10. The method of claim 8, wherein determining that the one or more audio-only criteria are satisfied comprises:
determining that a measure of network bandwidth of a non-Wi-Fi network between the messaging platform and the user device does not satisfy a threshold.

11. The method of claim 8, wherein determining that the one or more audio-only criteria are satisfied comprises determining that a measure of network bandwidth exceeds a threshold for at least a time threshold.

12. One or more non-transitory computer storage media encoded with computer program instructions that when executed by one or more computers cause the one or more computers to perform operations comprising:
receiving, by a user device from a messaging platform, a plurality of content items to be presented in a message stream on the user device, wherein a content item of the plurality of content items references video content having audio data and video data stored by the messaging platform, wherein the user device is configured to request only audio data of content items referencing video content in response to determining that one or more audio-only criteria are satisfied;

presenting, by the user device, the plurality of content items in a message stream;

determining, by the user device, that one or more audio-only criteria are satisfied;

receiving, by the user device from the messaging platform, a selection within the message stream of a user interface element of a content item referencing video data, wherein the selection represents a user request to present content referenced by the content item;

determining by the user device, that the content item is associated with a no-audio-only flag set by the messaging platform;

in response to determining that the content item is associated with the no-audio-only flag set by the messaging platform, requesting, by the user device, video data of the video content referenced by the content item despite the one or more audio-only criteria being satisfied; and receiving and presenting the video data of the video content referenced by the content item.

13. The method of claim 8, further comprising:
analyzing, by the messaging platform, previous user engagement data with the content item when presented with both video data and audio data, and separately when only audio data is presented with the video content;

determining, by the messaging platform, that a first measure of user engagement with the content item when presented with only audio data satisfies a threshold relative to a second measure of user engagement with the content item when presented with both video data and audio data; and in response, setting, by the messaging platform, the no-audio-only flag for the content item.

14. The one or more non-transitory computer storage media of claim 12, wherein the operations further comprise:
analyzing, by the messaging platform, previous user engagement data with the content item when presented with both video data and audio data, and separately when only audio data is presented with the video content;

determining, by the messaging platform, that a first measure of user engagement with the content item when presented with only audio data satisfies a threshold relative to a second measure of user engagement with the content item when presented with both video data and audio data; and in response, setting, by the messaging platform, the no-audio-only flag for the content item.

15. The method of claim 8, wherein determining that the one or more audio-only criteria are satisfied comprises:
determining that a screen of the user device is asleep or locked.

16. The method of claim 8, wherein determining that the one or more audio-only criteria are satisfied comprises:
determining that a user interface of an application that causes the user device to display the video content is closed.

17. The one or more non-transitory computer storage media of claim 12, wherein the instructions cause the user device to play the audio data of the video content on the user device when the one or more audio-only criteria are satisfied and the no-audio-only flag has not been set, including playing the audio data of the video content without presenting video data of the video content referenced by the content item.

18. The one or more non-transitory computer storage media of claim 12, wherein determining that the one or more audio-only criteria are satisfied comprises:
determining that a measure of network bandwidth of a non-Wi-Fi network between the messaging platform and the user device does not satisfy a threshold.

19. The one or more non-transitory computer storage media of claim 12, wherein determining that the one or more audio-only criteria are satisfied comprises determining that a measure of network bandwidth exceeds a threshold for at least a time threshold.

20. The one or more non-transitory computer storage media of claim 12, wherein determining that the one or more audio-only criteria are satisfied comprises:

determining that a screen of the user device is asleep or locked.

21. The one or more non-transitory computer storage media of claim 12, wherein determining that the one or more audio-only criteria are satisfied comprises:
determining that a user interface of an application that causes the user device to display the video content is closed.

* * * * *